June 2, 1925.
E. C. DITTMAR
1,540,110
METHOD OF FINISHING FLOORING
Filed Sept. 14, 1921
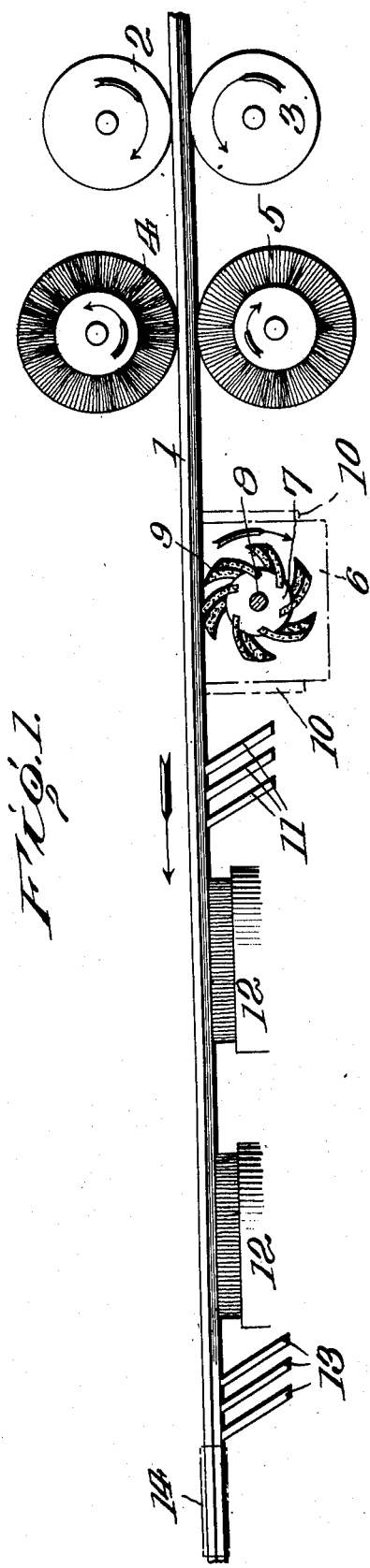
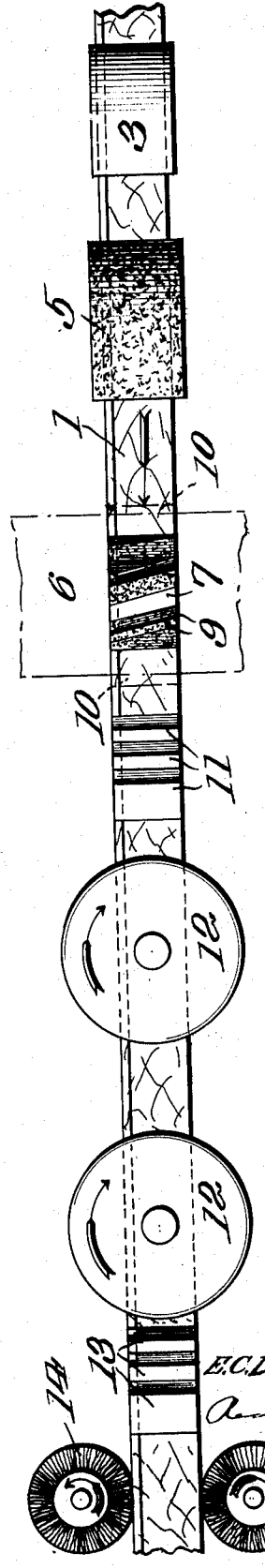
Inventor
E.C. DITTMAR.
By
Attorney Patented June 2, 1925.

1,540,110

UNITED STATES PATENT OFFICE.

ELMER C. DITTMAR, OF WILLIAMSPORT, PENNSYLVANIA, ASSIGNOR TO THE CROOKS-DITTMAR COMPANY, OF WILLIAMSPORT, PENNSYLVANIA, A CORPORATION OF PENNSYLVANIA.

METHOD OF FINISHING FLOORING.

Application filed September 14, 1921. Serial No. 500,656.

*To all whom it may concern:*

Be it known that I, ELMER C. DITTMAR, a citizen of the United States, residing at Williamsport, in the county of Lycoming and State of Pennsylvania, have invented certain new and useful Improvements in Methods of Finishing Flooring, of which the following is a specification, reference being had therein to the accompanying drawing.

This invention relates to the method of filling strips of lumber with a heavy filler as disclosed in my Patent Number 1,339,106, granted to me May 4, 1920, prior to the coating of the strip with varnish, the object being to provide a method by means of which strips of lumber can be filled very rapidly in such a manner that the pores of the strip of lumber will be completely filled so that a smooth surface can be obtained when the varnish is applied.

Another and further object of my invention is to provide a method in which a strip of lumber is set in motion and while in motion is first cleaned, then filled with a heavy filler under pressure, then subjected to a scraping action, then to a wiping action, and then to a scraping action so that the filler applied will be thoroughly rubbed in and polished before it leaves the apparatus in which the method is carried out.

A further object of the invention is to provide a method in which the various steps cooperate with one another so as to thoroughly apply the filler to the surface of the strip in such a manner that it is forced into the pores and all surplus removed therefrom before it leaves the apparatus in which the method is carried out, which enables the strip to be at once passed through a varnish machine and given a coating of varnish.

Other and further objects and advantages of the invention will be hereinafter set forth and the novel features thereof defined by the appended claims.

In the drawings,

Figure 1 is a top plan view showing an apparatus diagrammatically for carrying out my improved method of filling strips of lumber; and Figure 2 is a side elevation showing the apparatus diagrammatically for carrying out the method of filling strips of lumber.

In constructing an apparatus for carrying out my improved method of filling strips of lumber I have preferably provided means for guiding the strips in the passage therethrough so that the strip will be held and moved in a defined path, the particular construction of guiding means forming no part of this invention.

In the drawing the strip of lumber to be finished is indicated by the numeral 1, said strip being propelled or moved through the aforesaid guiding means by a pair of feed rollers 2 and 3. The strip then passes between a pair of brushes 4 and 5 for cleaning the dirt and dust from the strip. The strip is then in condition to receive the filler and in the drawing 6 indicates a receptacle adapted to contain a heavy filler which is provided with a discharge opening over which the strip 1 passes so that filler will be applied to the strip in its passage thereby, said filling receptacle 6 having a revoluble agitator 7 mounted therein formed of a central hub portion 8 provided with flexible strips or fins 9 for wiping the filler into the pores of the wood in its passage over the discharge opening and for maintaining the filler at the proper consistency within the receptacle.

The agitator is revolved in the opposite direction to the movement of the material so that at the point of application of the filler to the strip, the flexible fins engage the strip and wipe the filler into the strip. This provides means for applying filler under pressure as the agitator is so disposed within the filling receptacle that the filler within the receptacle is forced by the agitator against the strip in its movement past the discharge opening and at the same time, the fins which are spirally arranged, will force the filler against the strip and wipe the strip. The discharge opening being arranged at the lower end of the filler receptacle and by the fins or blades of the agitator being spirally arranged forces the filler to the bottom of the receptacle and against the material under pressure.

Arranged alongside of the filler receptacle is a rubbing device 10 which is held against the face of the strip under tension so that the filler thus applied is forced further into the pores and a portion of the surplus removed therefrom.

As the strip continues in its movement through the apparatus, it is subjected to a series of end rubbing devices 11 which perform the function of forcing the filler further into the pores and wiping off the surplus of the filler applied and these end rubbing devices are preferably held in contact with the face of the strip under tension so that as the strip passes the rubbers, pressure is applied to the coating of filler on the strip so as to rub in and remove the surplus filler.

As the strip proceeds, it comes in contact with a series of wiping or buffing devices 12 which preferably are formed of a central cross of leather fabric, rubber, wood or other material and a marginal brush formed of a series of brushes of leather fabric, rubber, wood or other material inserted in disks, said wiping or buffing devices being rotated in the direction as shown by the arrows in Figure 2, which is opposite to the direction of travel of the material and as these devices are revolving at a high rate of speed and in such a manner that they wipe crosswise of the grain of the material, the filler is forced further into the pores and all surplus removed therefrom. As the wipers or buffers revolve, they act as means for drying the filler applied.

The face of the strip with the filler thus applied is then engaged by a series of end rubbing devices 13 constructed in substantially the same manner as the end rubbing devices 11 which act on the filler so as to force the same further into the pores of the wood and to remove any surplus which has not been removed.

Before the strip leaves the apparatus, it passes between a pair of revolving brushes 14 which remove any surplus of filler which has been forced on the edges of the strip of lumber so as to allow the strip to leave the apparatus in such a condition that the filler applied is not only forced into the pores of the wood but is given a polish so that it can then be placed in a varnish machine and a coating of varnish applied.

While in the drawing I have shown a certain number of filler devices, end rubbers, wipers and buffing wheels, I am aware that the number of these devices employed for carrying out my method is immaterial as they can be increased or decreased as desired or to meet the demand as the character of material being operated on varies considerably as by increasing or decreasing the number of devices, various kinds of woods can be operated on successfully and therefore I do not wish to limit myself to the exact number of devices, as my invention consists broadly in a method of filling a strip of lumber with a heavy filler by applying a heavy filler to the face of the strip under pressure, then subjecting the same to lengthwise rubbing devices, then crosswise wiping devices and then lengthwise rubbing devices so that the heavy filler applied will be thoroughly rubbed into the pores and all surplus removed therefrom and the filler applied dried to a certain extent or sufficiently to allow a coating of varnish to be applied.

My method is the first step in pre-finishing strips of lumber as clearly described in my companion applications, Serial Numbers 500,657; 500,658; 500,659; 500,660 and 500,661, filed September 14, 1921, and while I have only shown diagrammatically in this application an apparatus for carrying out my method, the particular construction of apparatus used is thoroughly illustrated in my companion applications and I have found that each of the operations set forth in the method herein described are essential in applying a coating of filler to a strip of lumber.

What I claim is:—

1. The method of filling strips of lumber consisting in setting in motion a strip of lumber and while in motion applying a coating of filler thereto, subjecting the coating of filler applied first to a lengthwise scraping or rubbing action, then to a crosswise wiping or buffing action, then to a lengthwise scraping or rubbing action for forcing the filler applied into the pores of the wood and for polishing and removing the surplus filler therefrom.

2. The method of finishing strips of lumber consisting in first cleaning the strip, then applying filler thereto under pressure, then rubbing the filler lengthwise of the pores of the strip, then wiping the filler crosswise into the pores of the strip, then rubbing the strip lengthwise and finally cleaning the edge of the strip of any surplus filler.

3. The method of finishing a strip of lumber consisting in continuously moving a strip of lumber and while in motion applying filler thereto, rubbing the strip lengthwise, then wiping it crosswise and then rubbing it lengthwise for forcing the filler into the pores of the wood and for removing the surplus therefrom.

4. The method of finishing a strip of lumber consisting in setting a strip of lumber in longitudinal motion and while it is in motion and without interrupting such motion applying a coating of filler to the surface thereof, then rubbing the strip lengthwise for forcing the filler into the pores of the wood and for removing the surplus therefrom, then wiping it crosswise for forcing the filler into the wood and for removing the surplus therefrom, then wiping it lengthwise for forcing the filler into the wood and for removing the surplus therefrom.

5. The method of coating and finishing strips of lumber consisting in propelling the strip of lumber in a defined path, cleaning the strip while in motion, applying filler thereto while in motion, rubbing the filler into the pores of the wood while in motion lengthwise of the grain, then wiping the filler into the pores of the wood crosswise of the grain and then rubbing the filler lengthwise of the grain and then cleaning the strip of the surplus filler.

6. The method of applying a filler to a strip of lumber consisting in setting a strip of lumber in longitudinal motion and while it is in motion and without interrupting such motion first cleaning the strip, then applying filler to the surface of the strip under pressure, then rubbing the strip lengthwise, then wiping the strip crosswise, then rubbing the strip lengthwise and finally cleaning the edges of the strip to remove the surplus filler therefrom.

7. The method of finishing strips of flooring consisting in first cleaning the strip, then applying filler thereto under pressure, then rubbing the filler lengthwise into the pores of the strip, then wiping the filler crosswise into the pores of the strip, buffing the same and then rubbing the strip lengthwise.

8. The method of finishing a strip of lumber consisting in setting a strip of lumber in longitudinal motion and while it is in longitudinal motion and without interrupting such motion, first cleaning the strip, then applying filler to the surface thereof under pressure, then rubbing the filler lengthwise into the pores of the strip, then wiping the strip crosswise, then rubbing the strip lengthwise and finally cleaning the edges of the strip for removing the surplus therefrom.

9. A method of finishing a strip of lumber consisting in continuously moving the strip of lumber and while in motion applying a filler thereto, second subjecting the filler applied to a rubbing action lengthwise of the strip, third wiping the strip crosswise and then subjecting the strip to a brushing action to remove the surplus filler therefrom.

In testimony whereof I hereunto affix my signature.

ELMER C. DITTMAR.